No. 752,966. Patented February 23, 1904.

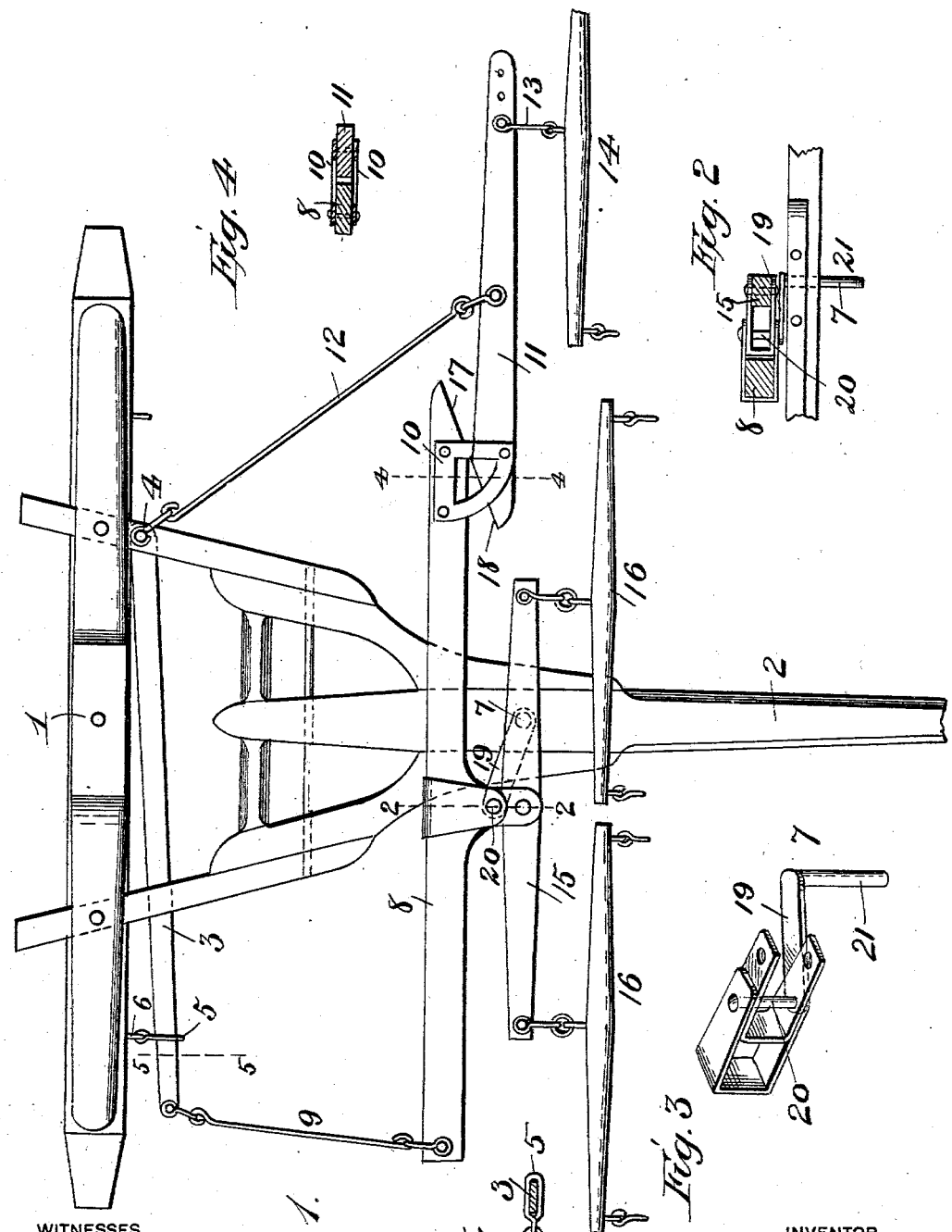

UNITED STATES PATENT OFFICE.

JAMES FARMER, OF BARRY, ILLINOIS.

DRAFT-EQUALIZER.

SPECIFICATION forming part of Letters Patent No. 752,966, dated February 23, 1904.

Application filed June 23, 1903. Serial No. 162,744. (No model.)

*To all whom it may concern:*

Be it known that I, JAMES FARMER, a citizen of the United States, residing at Barry, in the county of Pike and State of Illinois, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has relation to draft-equalizers; and it consists in the novel construction and arrangement of its parts, as hereinafter described.

The object of my invention is to provide a draft-equalizer adapted to have three horses hitched thereto and to be used on farm-wagons, reapers, mowers, &c.

It consists, primarily, of a draft-bar fixed at one end to one of the hounds and at its opposite end passing through a link attached to a draft-hook fixed to the axle beyond the opposite hound, the last said end of said draft-bar extending approximately a distance beyond the hound equal to the distance from the hound to the king-bolt. The tongue is provided with a crank-pin, to which is fulcrumed at an intermediate point (approximately the middle) a draft-lever, the intermediate portion of the crank-pin extending out on the side of the tongue in substantially the same direction as the outer end of the draft-bar above referred to. One end of said draft-lever is connected by means of a link with the outer end of the draft-bar, and a supplementary draft-lever is fulcrumed to the opposite end of the first said draft-lever and is connected, by means of a link attached to its middle, with the hound, to which the inner end of the draft-bar is attached. Said supplementary lever is provided at its outer end with an adjustable clevis, which carries a swingletree. A doubletree is pivoted to the laterally-extending end of the crank-pin, and said doubletree at each end carries a swingletree. At the point of connection between the draft-lever and supplementary lever a suitable means is provided, which is adapted to permit necessary oscillation of the two levers at that point, and at the same time to limit the oscillatory movement of both.

In the accompanying drawings, Figure 1 is a top plan view of the draft-equalizer. Fig. 2 is a transverse sectional view cut on the line 2 2 of Fig. 1. Fig. 3 is a perspective view of the crank-pin and collars adapted to receive the draft-lever and the doubletree. Fig. 4 is a transverse sectional view of the levers cut on the line 4 4 of Fig. 1, and Fig. 5 is a transverse sectional view of the draft-bar cut on the line 5 5 of Fig. 1.

Treating a line drawn from the king-bolt perforation 1 through the longitudinal axis of the tongue 2 as the line of draft, the draft-bar 3 extends substantially transversely across said line of draft and is secured at one end under one of the hounds at the point 4. The opposite end of said bar passes through the link 5, which is attached to the draft-hook 6, the distance from the line of draft to the point 4 being substantially one-half of the distance from the said line of draft to the opposite end of said draft-bar. A crank-pin 7 is pivoted at one end in the line of draft, and its opposite end extends laterally in substantially the same direction as the longer end of the draft-bar 3. The draft-lever 8 is fulcrumed to the extended end of said crank-pin 7, and the link 9 connects one end of the said draft-lever 8 with the longer end of the draft-bar 3. The opposite portion of the said draft-lever 8 extends across the tongue 2 and is provided on its opposite sides with the angle-plates 10 10, and between the said plates 10 10 is fulcrumed the inner end of the supplementary draft-lever 11, the said levers being in substantially the same plane, the lever 11 being in front of the lever 10. The link 12 connects the middle of the lever 11 with the point 4. The extreme outer end of the lever 11 is provided with an adjustable clevis 13, which supports a swingletree 14. The doubletree 15 is pivoted to the extended end of the crank-pin 7. One end of said doubletree 15 extends across the tongue 2, and the said doubletree 15 is provided at each end with suitable clevis, which carry the swingletrees 16 16. The adjacent ends of the levers 8 and 11 are chamfered off, respectively, as at 17 and 18. The connection between the two said levers at this point permits a certain amount of oscillatory movement; but the chamfered ends 17 and 18 limit the said movement. The intermediate portion 19 of the crank-pin 7 is flattened. As this portion rests on top of the tongue 2 and under the draft-lever 8 and doubletree 15, the said flattened portion does not interfere with the movement of its parts, and at the same time the said portion contains sufficient metal to withstand the strain that the said pin is subjected to. The ends 20 and 21 of the said pin 7 extend parallel to each other and from opposite sides of the flattened intermediate portion 19. The end 21 is adapted to rest in a perforation in the tongue 2, while the end 20 supports the draft-lever 8 and the doubletree 15. It will thus be seen that two horses are attached to the equalizer on one side of the tongue, while one horse is attached to the equalizer on the opposite side and that the pull from the two horses adjacent the tongue is transferred to the extended end of the crank-pin 7, which may oscillate in its bearings, and that the pull from the said two horses from that point is transferred through the draft-lever 8, link 9, and draft-bar 3 to the front axle, and while the pull from the animal farthest from the tongue is exerted upon the lever 11 through the link 12 to the front axle, the leverage exerted upon the lever 11 by the last said animal is applied to the end of the draft-lever 8, thus equalizing the draft.

It was my original intention to apply the draft-equalizer without using a draft-bar 3 and attaching the rear end of the link 9 directly to the axle; but I found that in so doing that I could not attach the end of the said link far enough away from the line of draft to secure the proper relation of the parts without interfering with the wagon-hub. Consequently I employed the draft-bar 3, which brings the point of connection in front of the hub. As all wagons are not the same width from one stay-chain hook to the other, I provide the stay-chain hook 6 with the link 5, which surrounds the draft-bar 3, and consequently the said draft-bar may be applied to the vehicle without reference to the distance between the said stay-chain hooks.

Having described my invention, what I claim as new, and desire to secure by Letters Patent, is—

1. A draft-equalizer, consisting of a draft-bar attached at one end to the vehicle-hound, and extending across the line of draft approximately twice the distance from the said line of draft to the said point of attachment to the hound, and being connected at its longer end to the axle, a draft-lever fulcrumed to the tongue and having one end connected to the longer end of said draft-bar, a supplementary lever fulcrumed to the opposite end of said draft-lever, and a connection connecting said supplementary lever with the hound to which the draft-bar is attached.

2. A draft-equalizer, consisting of a draft-bar connected at one end to one of the hounds of the vehicle, and extending across the line of draft substantially twice the distance from said line of draft to the point where it is connected to said hound, and being connected at its longer end to the axle, an oscillating pin pivoted to the tongue and having an end extending in substantially the same direction as the longer end of the draft-bar, a draft-lever fulcrumed to the extended end of said crank-pin, a connection connecting one end of said lever with the longer end of the draft-bar, a supplementary lever fulcrumed to the opposite end of said draft-lever, a connection connecting said supplementary lever with the hound to which the draft-bar is attached.

3. A draft-equalizer, consisting of a draft-bar attached at one end to the vehicle-hound and extending across the line of draft substantially twice the distance as the distance between the said line and the point to which it is attached to said hound, and being connected at its longer end to the axle, a draft-lever fulcrumed to the tongue, a connection connecting one end of said lever with the longer end of said draft-bar, a supplementary lever extending in the same plane as said draft-lever and being fulcrumed to the same and in front thereof, and a connection connecting said supplementary lever with the hound, to which the draft-bar is attached.

4. A draft-equalizer, consisting of a draft-bar attached at one end to one of the hounds of the vehicle, and extending across the line of draft substantially twice the distance as the distance between the said line and the point to which it is attached to the hound, and being connected at its longer end to the axle, a draft-lever fulcrumed to the tongue and being connected at one end with the longer end of said draft-bar, a supplementary lever extending in the same plane as said draft-lever, and being in front thereof and fulcrumed thereto, and having a chamfered end facing said draft-lever, and a connection between said supplementary lever and the hound to which the draft-bar is attached.

5. A draft-equalizer, consisting of a draft-bar attached at one end to one of the hounds of the vehicle, and extending substantially twice the distance between the line of draft and the point, to which it is attached to the hound, and being secured at its longer end to the axle, a draft-lever fulcrumed to the tongue, and being connected at one end to the longer end of said draft-bar, the opposite end of said lever being chamfered, a supplementary lever extending in the same plane as the draft-lever and being located in front thereof, and fulcrumed thereto, and a connection between said supplementary lever and the hound, to which the draft-bar is attached.

6. A draft-equalizer, consisting of a draft-bar fixed at one end to one of the hounds of the vehicle, and extending across the line of draft for a distance substantially twice the distance between said line and the point to which the bar is attached to the hound, and being secured at its longer end to the axle, a draft-lever fulcrumed to the tongue and being connected at one end with the longer end of the draft-bar, and being chamfered at its opposite end, a supplementary lever extending in the same plane as the draft-lever, and being fulcrumed thereto, and having a chamfered end opposite said draft-lever, and a connection between said supplementary lever and the hound to which the draft-bar is attached.

7. A draft-equalizer, consisting of a draft-lever fulcrumed to the tongue and being connected at one end to the vehicle, a supplementary lever fulcrumed to the opposite end of said draft-lever and being connected to the vehicle.

8. A draft-equalizer, consisting of a draft-lever fulcrumed to the tongue, and being connected at one end to the vehicle, a supplementary lever extending in the same plane as said draft-lever, and being located in front thereof, and fulcrumed thereto, and a connection connecting said supplementary lever with the vehicle.

9. A draft-equalizer, consisting of a draft-lever fulcrumed to the tongue, and being connected at one end to the vehicle and having its opposite end chamfered, a supplementary lever located in the same plane as the first said lever, and being in front thereof, and fulcrumed thereto, and a connection between said supplementary lever and the vehicle.

10. A draft-equalizer, consisting of a draft-lever fulcrumed to the tongue and being connected at one end to the vehicle, a supplementary lever located in the same plane, as said draft-lever, and in front thereof, and being fulcrumed thereto, and having its end opposite the draft-lever chamfered, and a connection between said supplementary lever and the vehicle.

11. A draft-equalizer, consisting of a draft-lever fulcrumed to the tongue and being connected at one end with the vehicle, said draft-lever having its opposite end chamfered, a supplementary lever located in the same plane as the draft-lever, and in front thereof, and being fulcrumed thereto, and having its end opposite said draft-lever chamfered, and a connection between said supplementary lever and the vehicle.

12. A draft-equalizer, consisting of a draft-lever suitably connected to the tongue, a draft-bar fixed at one end to the vehicle and extending across the line of draft, and passing at its opposite end through a link attached to the vehicle, and a connection between said draft-lever and said draft-bar.

13. A draft-equalizer, consisting of a draft-lever fulcrumed to the tongue, a draft-bar extending across the line of draft, and being secured at one end to the vehicle the distance between the point where it is secured to the vehicle and the line of draft being substantially one-half of the distance between said line of draft and the opposite ends of said bar, and a connection between the longer end of said draft-bar and the vehicle, and suitable connections between said draft-bar and the draft-lever.

In testimony whereof I affix my signature in presence of two witnesses.

JAMES FARMER.

Witnesses:
    E. L. PENNER,
    N. R. DAVIS.